United States Patent [19]

Foster

[11] Patent Number: 4,661,143
[45] Date of Patent: Apr. 28, 1987

[54] PLUNGER FOR USE IN FORMING PARISONS

[75] Inventor: Thomas V. Foster, Doncaster, England

[73] Assignee: Emhart Industries, Inc., Farmington, Conn.

[21] Appl. No.: 821,941

[22] Filed: Jan. 24, 1986

[30] Foreign Application Priority Data

Jan. 26, 1985 [GB] United Kingdom ................. 8501992

[51] Int. Cl.$^4$ ............................................. C03B 11/06
[52] U.S. Cl. ........................................ 65/362; 65/169; 65/374.15
[58] Field of Search .................... 65/25.1, 169, 182.2, 65/182.5, 374.15, 362

[56] References Cited

U.S. PATENT DOCUMENTS

| | | | |
|---|---|---|---|
| 3,157,482 | 11/1964 | Nero et al. | 65/362 X |
| 3,202,498 | 8/1965 | Torok | 65/362 |
| 3,288,629 | 11/1966 | McCreight | 65/374.15 |
| 3,399,985 | 9/1968 | Greenler et al. | 65/374.15 |

Primary Examiner—Arthur Kellogg
Attorney, Agent, or Firm—H. Samuel Kieser

[57] ABSTRACT

A plunger (10; 30) for use in forming parisons during the manufacture of glass containers has a glass-contacting surface layer (18; 38) formed by a material which has, at least in a tip region of the plunger, a thermal conductivity in directions parallel to the glass-contacting surface (16; 36) of the layer greater than its thermal conductivity normal to the glass-contacting surface. A suitable material is pyrolytic graphite.

6 Claims, 2 Drawing Figures

PLUNGER FOR USE IN FORMING PARISONS

BACKGROUND OF THE INVENTION

This invention is concerned with plungers for use in forming parisons during the manufacture of glass containers.

Two well-established processes for manufacturing glass containers are known respectively as the "press and blow" process and the "blow and blow" process and this invention is applicable to plungers for use in either of these processes. The plungers used are made of metal and have to withstand high compressive forces.

In the "press and blow" process, a gob of molten glass is introduced into a parison-forming or blank mould and a plunger is moved into the mould to press the glass to the shape of the mould cavity. The plunger is then withdrawn and the parison is transferred to a finish mould in which it is blown to the shape of the mould cavity by the introduction of air into the space previously occupied by the plunger. The plungers used in the "press and blow" process are relatively long (typically 100 mm) and, where narrow neck containers are being manufactured, may be small in diameter (e.g. 18 mm).

When light-weight containers are manufactured by the "press and blow" process, it is advantageous to use short parisons and allow time for the parison to stretch before it is blown in the finish mould. This stretching time, during which the heat contained in the parison is redistributed to bring the parison to a uniform temperature, limits production speeds and is a disadvantage of the "press and blow" process in contrast to the "blow and blow" process described below. The stretching time can be reduced to a minimum if the heat extracted from the glass by contact with the plunger can be limited and, it is believed, that a stronger container results if chilling of the inside of the parison can be reduced.

It is an object of the present invention to provide a plunger which, in the "press and blow" process, allows a reduction of the heat extracted from the glass by contact with the plunger.

In the "blow and blow" process the parison is formed by a blowing operation in a blank mould and the parison is transferred to a finish mould for a further blowing operation to form the parison into a container. In forming the parison, the gob is introduced into the mould on top of a short plunger which acts to form the neck region of the parison. Air is blown on top of the gob to "settle" the glass around the plunger. The plunger is then withdrawn creating a space into which air is blown to blow the parison to the shape of the mould cavity.

In the "blow and blow" process, the time during which the glass is "settled" by the application of air on top of the gob should be kept to a minimum in order to avoid a heavy "settle wave" in the completed container and also in the interests of productivity. It is desirable, therefore, to extract heat from the glass in the neck region as rapidly as possible. However the glass which contacts the tip of the plunger has to be softened, by re-heating from the remainder of the glass, before the parison can be blown and this causes a delay if too much heat has been extracted from the glass at that point.

It is a further object of the present invention to provide a plunger which, in the "blow and blow" process, allows low heat extraction in the tip region of the plunger and higher heat extraction in the side regions of the plunger.

BRIEF SUMMARY OF THE INVENTION

The invention provides a plunger for use in forming parisons during the manufacture of glass containers, wherein the plunger has, at least in a tip region thereof, a glass-contacting surface layer formed by a material which has a thermal conductivity in directions parallel to the glass-contacting surface of the layer greater than its thermal conductivity normal to the glass-contacting surface.

Where the plunger described in the last preceding paragraph is for use in the "press and blow" process, the surface layer insulates the glass from the plunger reducing the heat extracted by the plunger. The higher thermal conductivity parallel to the glass-contacting surface, i.e. along the surface layer, enables the surface layer to rapidly equalise its temperature so that widely varying expansion over the surface layer is avoided which could precipitate spalling. The material must be able to withstand the high compressive forces required, have good abrasion resistance, and have a sticking temperature with glass higher than 800° C. and preferably above 1000° C. Preferably, the thermal conductivity normal to the glass-contacting surface should be less than 1.7 watts/meter/° K. Such a material is pyrolytic graphite which can provide a thermal conductivity of approximately 1.0 watts/meter/° K.

Where the plunger described in the last preceding paragraph but one is for use in the "blow and blow" process, the surface layer causes the lower heat extraction in the tip region of the plunger and higher heat extraction takes place in the side regions thereof.

In a plunger for use in the "press and blow" process, the surface layer may extend over side portions of the plunger, the thermal conductivity of the layer being greater in directions parallel to the glass-containing surface than its thermal conductivity normal to the glass-contacting surface over the side portions.

In a plunger for use in the "blow and blow" process, the surface layer may extend over side portions of the plunger, the thermal conductivity of the layer in directions normal to the longitudinal axis of the plunger being greater than its thermal conductivity parallel to said longitudinal axis.

The invention also provides a plunger for use in forming parisons during the manufacture of glass containers, wherein the plunger has a glass-contacting surface layer formed by pyrolytic graphite arranged so that the direction of lowest thermal conductivity of the pyrolytic graphite, at least in a tip region of the plunger, is normal to the glass-contacting surface of the layer.

BRIEF DESCRIPTION OF THE DRAWINGS

There now follows a detailed description, to be read with reference to the accompanying drawings, of two plungers which are illustrative of the invention. It is to be understood that the illustrative plungers have been selected for description by way of example and not of limitation of the invention.

In the drawings.

DETAILED DESCRIPTION OF PREFERRED EMBODIMENTS OF THE INVENTION

Figures 1, 2:
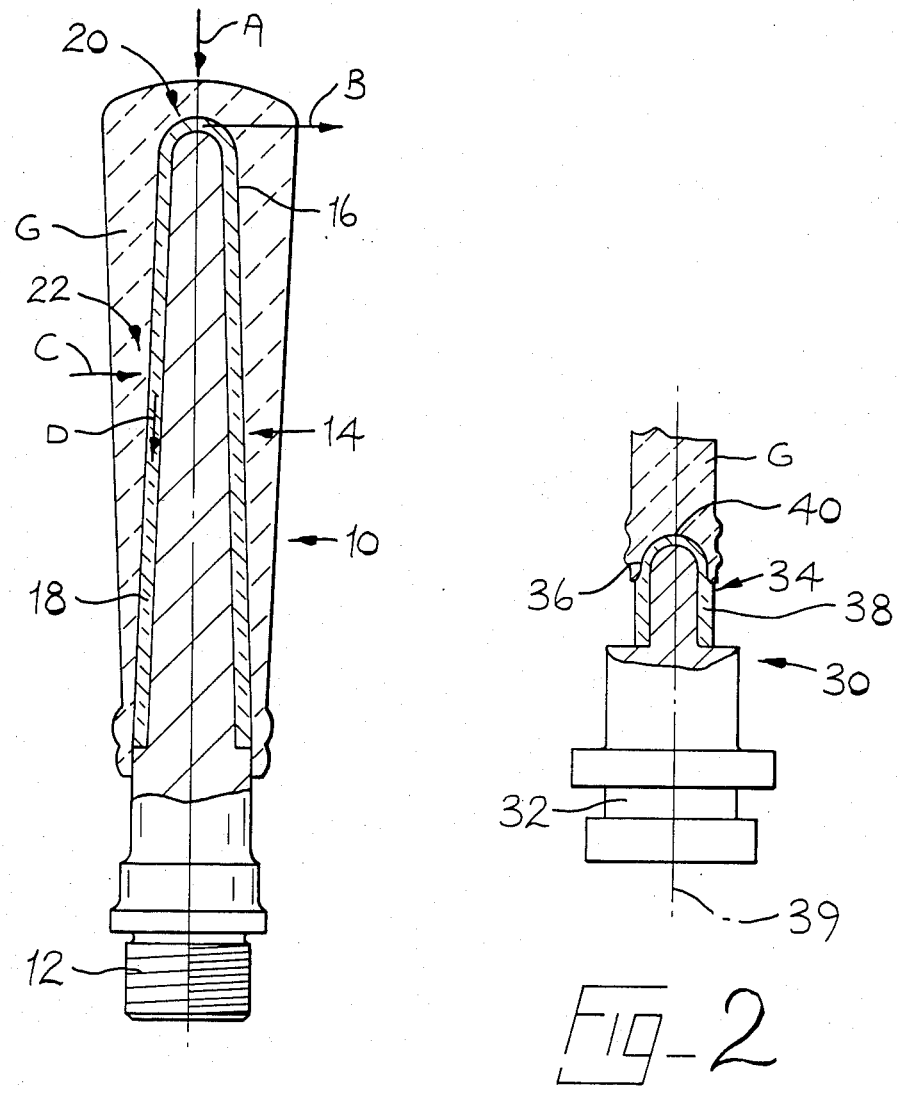
FIG. 1 is a side-elevational view with parts broken away of the first ilustrative plunger which is for use in the "press and blow" process.
FIG. 2 is a side-elevational view with parts broken away of the second illustrative plunger which is for use in the "blow and blow" process.

The first illustrative plunger 10 is for use in forming parisons during the manufacture of glass containers by the "press and blow" process. The plunger 10 has a base portion 12 by which it can be mounted on moving means therefor (not shown) by which the plunger can be moved into or out of a blank mould in conventional manner. The plunger 10 also comprises a glass-pressing portion 14 which is of circular cross-section and tapers away from the base portion 12. The portion 14 has a glass-contacting surface 16 arranged to engage molten glass G and press it to shape against a blank mould (not shown).

The plunger 10 is mainly made of metal but has a glass-contacting surface layer 18 which provides the glass-contacting surface. The layer 18 is formed by pyrolytic graphite. The pyrolytic graphite is arranged so that its thermal conductivity in directions parallel to the glass-contacting surface 16 is greater than its thermal conductivity normal to the glass-contacting surface. Thus, at the tip 20 of the plunger 10, the thermal conductivity of the layer 18 through the thickness of the layer 18 in the direction of the arrow A is less than the thermal conductivity along the layer 18 in the direction of the arrow B. At a point 22 on the side of the glass-pressing portion 14, the thermal conductivity through the layer 18 in the direction of the arrow C is less than that along the layer 18 in the direction of the arrow D. Thus, the direction of lowest conductivity is normal to the glass-contacting surface.

The thermal conductivity of the layer 18 normal to the glass-contacting surface 16, i.e. in the directions of the arrows A and C, is less than 1.7 watts/meter/°K at 1100° C. being approximately 1.0 watts/meter/°K. In use, the layer 18 insulates the metal part of the plunger 10 from the glass G but the temperature is rapidly equalised over the portion 14 because of the higher thermal conductivity along the layer 18.

The second illustrative plunger 30 is for use in forming parisons during the manufacture of glass containers by the "blow and blow" process. The plunger 30 has a base portion 32 by which it can be mounted on moving means therefor (not shown). The plunger 30 also comprises a glass-contacting portion 34 of circular cross-section which is generally cylindrical except for a domed tip 40. The portion 34 has a glass-containing surface 36 arranged to engage molten glass G and shape the neck region of a parison.

The plunger 30 is mainly made of metal but has a glass-contacting surface layer 38 on the portion 34 which provides the glass-contacting surface 36. The layer 38 is formed by pyrolytic graphite. The pyrolytic graphite is arranged so that its thermal conductivity in directions normal to the longitudinal axis 39 of the plunger is greater than its thermal conductivity parallel to the axis 39. Thus, at the tip 40, the thermal conductivity in directions parallel to the glass-contacting surface 36 is greater than its thermal conductivity normal to the glass-contacting surface. On the sides of the plunger, however, the directions of greatest thermal conductivity are through the layer 38, i.e. the direction of lowest thermal conductivity does not follow the surface of the plunger (as it does in the plunger 10) but remains constant.

In use, the layer 38 causes lower heat extraction in the tip region 40 of the plunger 30 and higher heat extraction along the side regions thereof. The heat extraction is less at the tip 40, as the layer insulates the portion 32 from the glass, and greater along the sides because the layer acts to conduct heat to the portion 32.

What is claimed is:

1. A plunger for use informing parisons during the manufacture of glass containers, wherein the plunger has, at least in a tip region thereof, a glass-contacting surface layer formed by a material which has a thermal conductivity in directions parallel to the glass-contacting surface of thelayer greater than its thermal conductivity normal to the glass-contacting surface.

2. A plunger according to claim 1, wherein the thermal conductivity of the material normal to the glass contacting surface is less than 1.7 watts/meter/°K at 1100° C.

3. A plunger according to claim 1, wherein the material is pyrolytic graphite.

4. A plunger according to claim 1, wherein the surface layer extends over side portions of the plunger, the thermal conductivity of the layer being greater in directions parrallel to the glass-contacting surface than its thermal conductivity normal tothe glass-contacting surface over the side portions.

5. A plunger according to claim 1, wherein the surface layer extends over side portions of the plunger, the thermal conductivity of the layer in directions normal to the longitudinal axis of the plunger being greater than its thermal conductivity parallel to said longitudinal axis.

6. A plunger for use in forming parisons during the manufacture of glass containers, wherein the plunger has a glass-contacting surface layer formed by pyrolytic graphite arranged so that the direction of lowest thermal conductivity of the pyrolytic graphite, at least in a tip region of the plunger, is normal to the glass-contacting surface of the layer.

* * * * *